(12) United States Patent
Mayer

(10) Patent No.: US 12,181,064 B2
(45) Date of Patent: Dec. 31, 2024

(54) VALVE

(71) Applicant: VAT Holding AG, Haag (CH)

(72) Inventor: Thomas Mayer, Hohenems (AT)

(73) Assignee: VAT Holding AG, Haag (CH)

( * ) Notice: Subject to any disclaimer, the term of this patent is extended or adjusted under 35 U.S.C. 154(b) by 170 days.

(21) Appl. No.: 18/168,020

(22) Filed: Feb. 13, 2023

(65) Prior Publication Data

US 2023/0258278 A1 Aug. 17, 2023

(30) Foreign Application Priority Data

Feb. 11, 2022 (DE) .......................... 102022103235.3

(51) Int. Cl.
*F16K 29/00* (2006.01)
*F16K 3/18* (2006.01)
*F16K 51/02* (2006.01)

(52) U.S. Cl.
CPC .............. *F16K 29/00* (2013.01); *F16K 3/18* (2013.01); *F16K 51/02* (2013.01); *F16K 2200/302* (2021.08); *F16K 2200/3051* (2021.08)

(58) Field of Classification Search
CPC .................................. F16K 29/00; F16K 3/18
See application file for complete search history.

(56) References Cited

U.S. PATENT DOCUMENTS

| 1,803,889 A | 5/1931 | Bohnhardt et al. |
| 2,210,189 A | 8/1940 | Sorensen |
| 4,290,580 A * | 9/1981 | Balhouse ................ F16K 3/182 |
| | | 251/169 |

FOREIGN PATENT DOCUMENTS

| DE | 1689465 | 12/1954 |
| DE | 102019132862 | 6/2021 |

OTHER PUBLICATIONS

"Known Valve"—admitted prior art—Jan. 1, 2021.

* cited by examiner

*Primary Examiner* — Kevin R Barss
(74) *Attorney, Agent, or Firm* — Volpe Koenig

(57) ABSTRACT

A valve (1) with a valve housing (2) and valve openings (3), and with a closing element (5) and at least one valve drive (6). The valve also has two mutually opposite flanges (9, 10) each having a passage opening (11). The flanges can be moved towards and away from one another by the valve drive and are force-coupled to the closing element with respect to the movements of the closing element and in the fully opened position of the closing element are pressed against the wall regions (4) of the valve housing and thus the passage openings of the flanges connect the valve openings together. The two flanges (9, 10) each include a sequence of fingers (12) and recesses (13) arranged in between, and the fingers surround the passage openings and the fingers of the one flange engage in the respective recesses of the other flange.

11 Claims, 3 Drawing Sheets

Fig. 1
Fig. 2
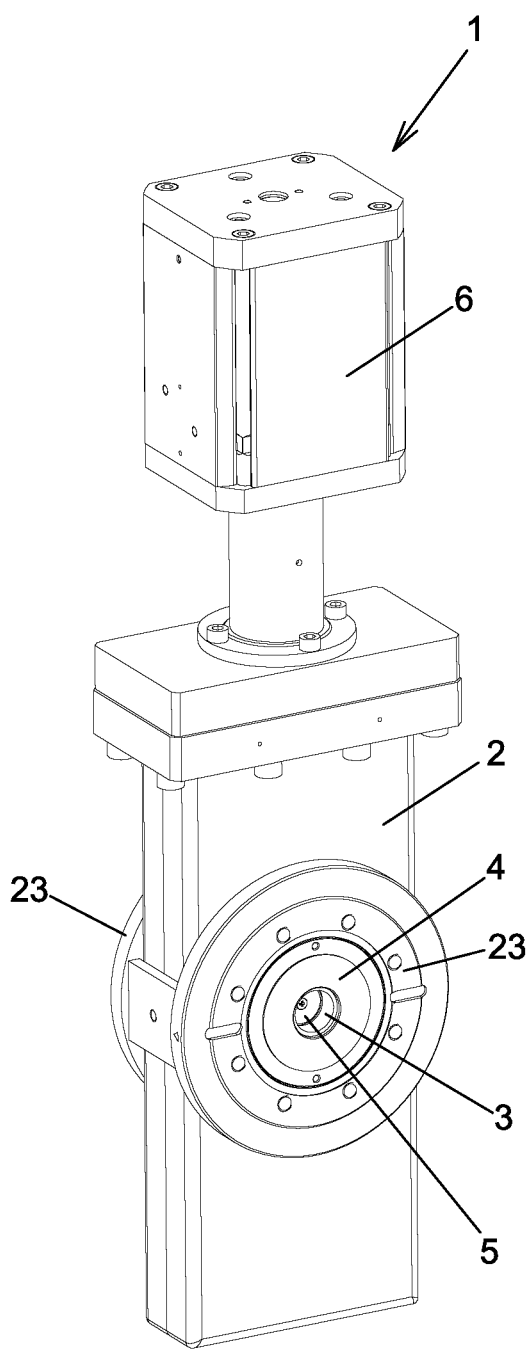
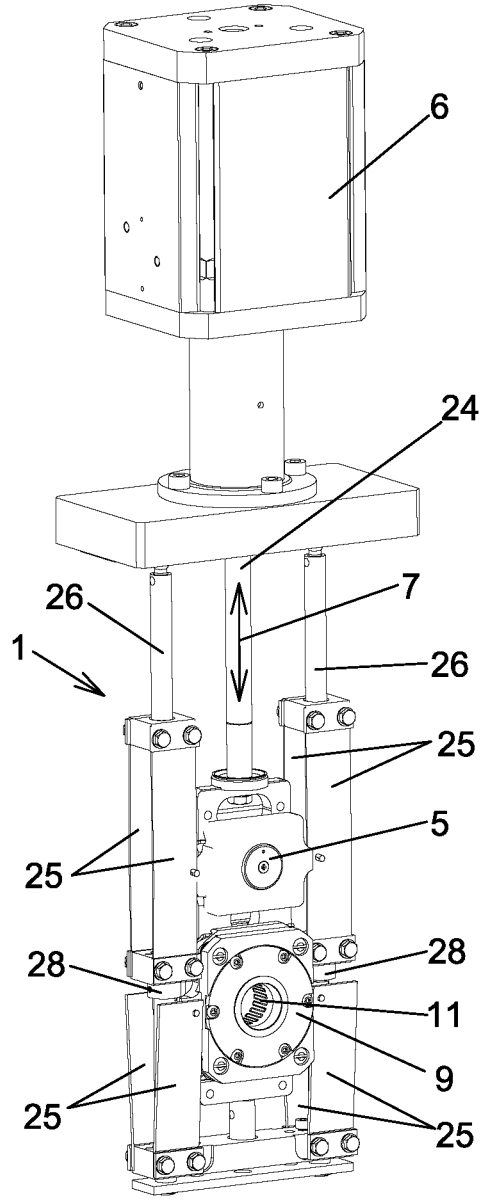

Fig. 3
Fig. 4
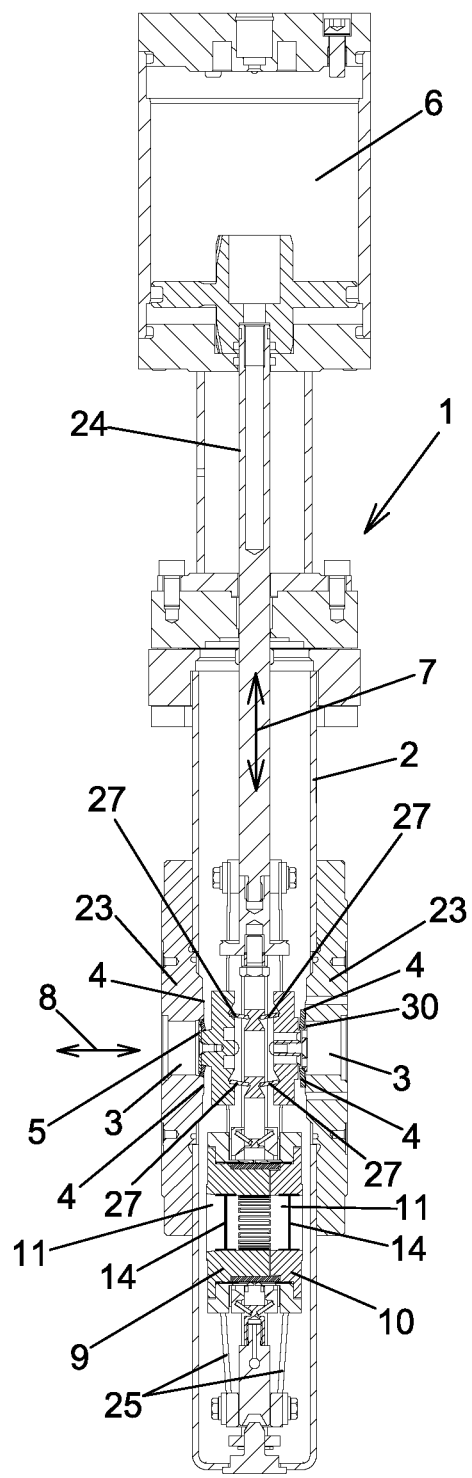
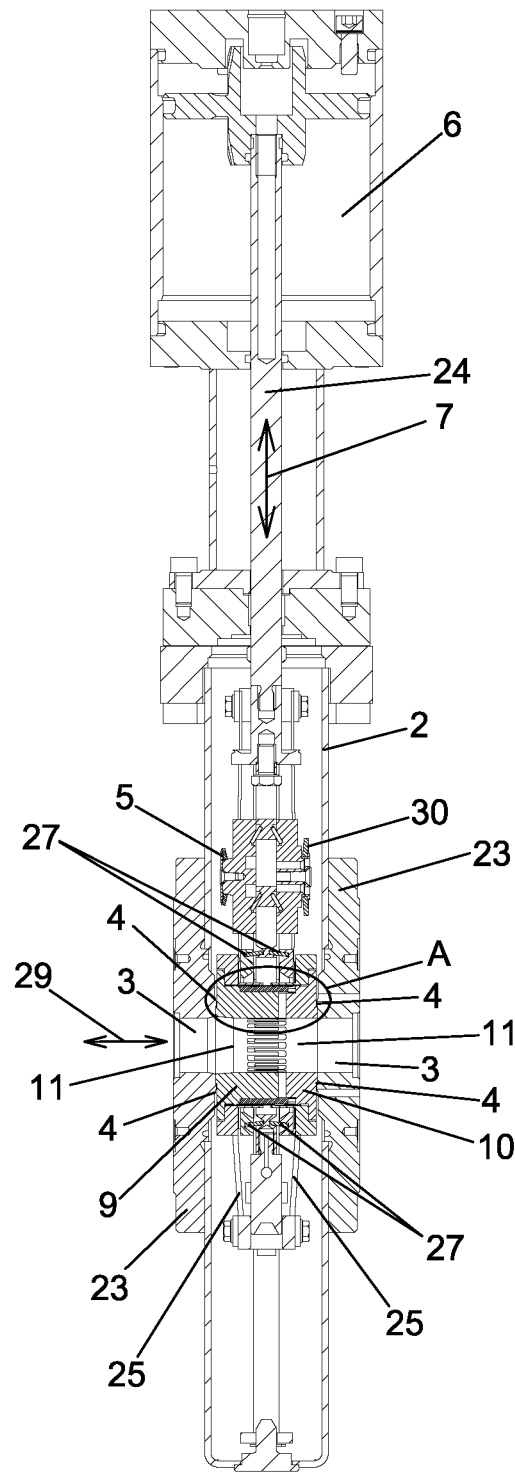

VALVE

CROSS-REFERENCE TO RELATED APPLICATIONS

This application claims priority from German Patent Application No. 10 2022 103 235.3, filed Feb. 11, 2022, which is incorporated herein by reference as if fully set forth.

TECHNICAL FIELD

The present invention concerns a valve, in particular a vacuum valve, with a valve housing and valve openings in mutually opposite wall regions of the valve housing, and a closing element and at least one valve drive; wherein the closing element in a closed position closes at least one of the valve openings, and in an intermediate position is raised from both valve openings and arranged between the valve openings, and in a fully opened position fully opens the valve openings; wherein the closing element can be moved to and fro by the at least one valve drive in mutually opposite first movement directions between the fully opened position and the intermediate position, and in mutually opposite second movement directions between the intermediate position and the closed position; wherein the valve also has two mutually opposite flanges each having a passage opening, wherein the flanges can be moved towards and away from one another by the at least one valve drive and are connected to the closing element by forced coupling moveably with respect to the movements of the closing element in the first movement directions, wherein the flanges in the fully opened position of the closing element are pressed against the mutually opposite wall regions of the valve housing and thus the passage openings of the flanges connect the valve openings together.

BACKGROUND

Valves of this type are used in practice e.g. in particle accelerators and similar, wherein in the fully opened position of the closing element, charged particles, in particular a jet of charged particles, can be conducted through the valve opening and the passage opening of the flanges. It is important that valves according to the invention deflect the charged particles or jet of charged particles as little as possible. A valve of this type is known from the prior art, from public prior use, in which elastically clamped plates are arranged between the flanges and deform elastically under the flange movements towards and away from one another. These clamped plates change the opening cross-section over the course of the passage opening, which may lead to an undesired deflection of the charged particles passing through the passage openings of the flanges.

SUMMARY

It is the object of the invention to improve a generic valve such that the charged particles or the jet of charged particles can pass through the passage openings of the flanges with as little disturbance as possible.

For this, the invention proposes a valve having one or more of the features disclosed herein.

According to the invention, it is therefore provided that the two flanges each comprise a sequence of fingers and recesses arranged respectively between two adjacent fingers, wherein the fingers of the respective flange surround the passage opening of the respective flange, and the fingers of the one flange engage in the respective recesses of the other flange.

Because of the design of the two flanges according to the invention with the fingers and recesses arranged in between, it is possible to keep the opening cross-sections of the flange passage openings constant, or substantially the same size everywhere. Surprisingly, it has been found that this very effectively prevents an undesired deflection of the charged particles or jet of charged particles on passage through the passage openings and valve openings. Preferably, in this context, it is provided that the opening cross-sections of the flange passage openings are the same size everywhere, at least in the regions of the fingers. This again preferably applies in particular when the flanges are pressed against the mutually opposite wall regions of the valve housing in the fully opened position of the closing element.

The passage openings of the two flanges are favorably aligned with one another in all flange positions. The valve openings in the mutually opposite wall regions of the valve housing are favorably also aligned with one another.

Valve drives according to the invention may have a single valve drive which moves the closing element and the flanges in the mutually opposite first movement directions, but also drives the closing element in the mutually opposite second movement directions, and also the flanges in their movements towards and away from one another. Alternatively, valves according to the invention may naturally also be configured with two or more valve drives, e.g. with a first valve drive for moving the closing element and the flanges in the mutually opposite first movement directions, and with at least one further valve drive for moving the closing element in the mutually opposite second movement directions and/or for moving the flanges towards and away from one another. For the design of such valve drives, the prior art offers various possibilities which may be used in correspondingly adapted form in the valves according to the invention.

The mutually opposite wall regions of the valve housing in which the valve openings are provided may preferably, in a fashion known in itself, each be configured as one of the valve seats surrounding the valve openings.

The second movement directions, and preferably also the movement directions in which the flanges can be moved towards and away from one another, are favorably angled, preferably orthogonally, to the mutually opposite first movement directions.

When the flanges are pressed against the mutually opposite wall regions of the valve housing in the fully opened position of the closing element, it may be said that the passage openings of the flanges connect the valve openings together fluid-conductively. Fluid-conductive here means that also at least charged particles and/or a jet of charged particles can be conducted through the passage openings and the valve opening.

The closing element may be a valve plate but also a closing element of another design. Here too, in principle, various embodiments known from the prior art may be used. The flange fingers may be formed as pins or also as plates. In any case, these are elongate elements with a freely protruding end, between which the corresponding recesses are arranged. Instead of fingers, they could also be called comb elements or tines.

Favorably, in any case it is provided that the fingers of the one flange engage in the recesses of the respective other flange in all positions of the flanges relative to one another. Further favorably, it is provided that the fingers of the one flange do not touch the fingers of the other flange. This again preferably applies in all positions of the flanges relative to one another. Alternatively, it could be said that the fingers of the one flange, preferably in all positions of the flanges relative to one another, are arranged contactlessly in the recesses between the fingers of the other flange. It is in any case preferred that the fingers of the respective flange surround the passage opening of the respective flange as a ring. The fingers of the respective flange are preferably formed straight and/or elongate towards the other flange.

Preferred variants of the invention provide that the flanges are arranged in the region of the fingers inside a bush which connects the flanges together. This has also proved favorable for better suppressing an undesired deflection of the electrically charged particles or jet of electrically charged particles passing through the valve opening and passage opening of the flanges. The bush is favorably mounted displaceably on at least one of the flanges.

The flanges are preferably connected together electrically conductively. This applies particularly preferably to all positions of the flanges relative to one another, but in particular when the flanges in the fully opened position of the closing element are pressed against the mutually opposite wall regions of the valve housing, and thus the passage openings of the flanges connect the valve openings together. Particularly preferred are embodiments of the invention in which the flanges are connected together electrically conductively by means of a contact plate, wherein the fingers of the flanges are arranged in an interior surrounded by the contact plate. The contact plate is favorably peripherally closed and/or tubular. To ensure a particularly good electrically conductive contact between the two flanges and the contact plate, preferred variants provide that each flange has a peripheral and outwardly protruding bead on an outside of the respective flange opposite the passage openings. Preferably, it is then provided that the contact plate lies on the bead of the respective flange. This ensures a permanent and secure electrical contact between the beads via the contact plate.

Preferred embodiments of the invention provide that a takeoff connector is arranged on an outside of the respective flange opposite the passage opening, wherein the contact plate is guided between the respective takeoff connector and the respective flange. The takeoff connectors are favorably formed as pipe stubs, at least in regions. It is preferably provided here that each takeoff connector has a peripheral and inwardly protruding bead, by means of which the respective takeoff connector presses against the contact plate. The contact plate is thus favorably clamped on one side between the beads of the flanges and on the other side between the beads of the takeoff connectors. With the aim of a secure electrical contact, the contact plate is preferably elastically deformable or sprung. The beads of the takeoff connectors here favorably press on the contact plate in a region which lies between the beads of the flanges.

BRIEF DESCRIPTION OF THE DRAWINGS

Further features and details of preferred embodiments of the invention are explained as examples in the following description of the figures. In the drawings:

FIG. 1 shows a valve according to the invention in a perspective illustration from the outside FIG. 2 shows the valve from FIG. 1 without valve housing FIG. 3 shows a longitudinal section through the valve from FIG. 1, wherein the closing element is in the closed position FIG. 4 shows a longitudinal section through the valve according to the invention from FIG. 1, wherein the closing element is in the fully opened position

DETAILED DESCRIPTION

Figure 5:
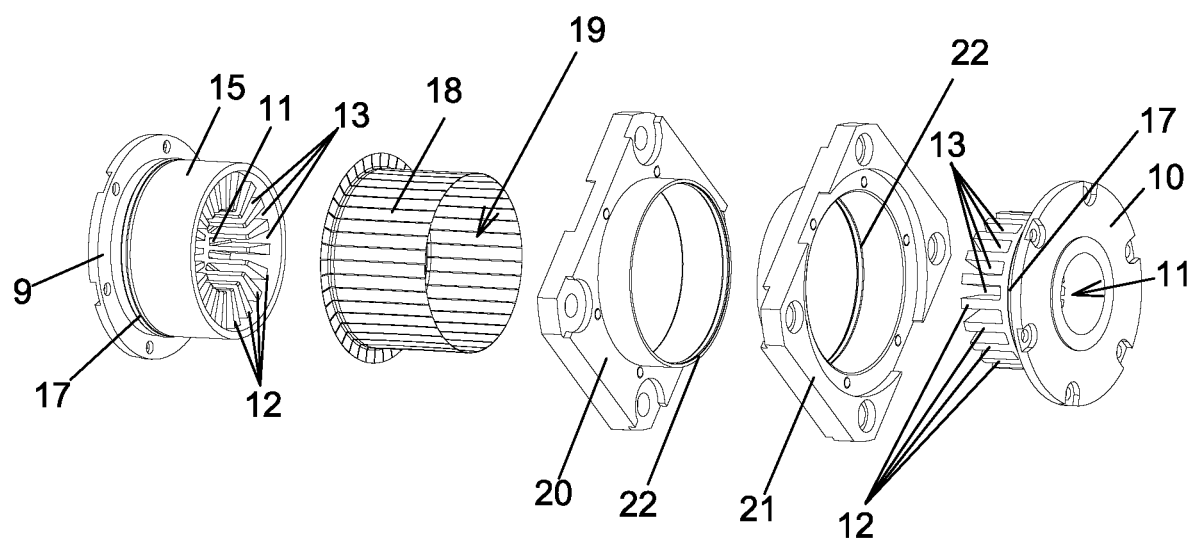
FIG. 5 shows the flange, contact plate and takeoff connectors of this exemplary embodiment according to FIGS. 1 and 4, in an exploded illustration; an FIG. 6 shows the region A from FIG. 4 on enlarged scale.

The valve 1 according to the invention, as also in the exemplary embodiment shown here, is preferably a so-called vacuum valve. Vacuum valves are normally used when working in a special atmosphere and/or at a special pressure level. Such valves in particular work with pressure differences of less than or equal to 0.001 mbar (millibar) or 0.1 Pascal. Vacuum valves may however also be designed for pressure differences below normal pressure, i.e. below 1 bar.

FIG. 1 now shows an embodiment variant of a valve 1 according to the invention which is configured as a vacuum valve, with a valve housing 2 and valve openings 3 arranged in mutually opposite wall regions 4 of the valve housing 2. In the exemplary embodiments shown and in others, the wall regions 4 surrounding the valve openings 5 may be formed as housing flanges 23, via which the valve 1 may be attached to corresponding pipelines and/or chamber outer walls of process chambers. This is known in itself and need not be explained in more detail. In a closed position, the closing element 5 of the valve 1 according to the invention closes at least one of the valve openings 3, as also shown in FIG. 1.

In FIG. 2, the valve housing 2 is not shown. Therefore, inter alia, the valve rods 24 driven by the valve drive 6 in the mutually opposite first movement directions 7 can be seen. In the exemplary embodiment shown, the valve drive 6 is a purely linear drive, which—as shown in the sectional illustrations in FIGS. 3 and 4—may be configured in the known fashion e.g. as a hydraulically or pneumatically driven piston-cylinder arrangement, but also as an electric linear drive and similar. FIG. 2 also clearly shows how the valve rods 24 connect the closing element 5 to the valve drive 6. Below the closing element 5, one of the two flanges 9 with passage opening 11 can be seen. The second flange 10 is here on the back side, which cannot be seen in FIG. 2. These flanges 9 and 10 can be moved by means of the at least one valve drive 6 towards and away from one another, and are force-coupled to the closing element 5 with respect to the movement of the closing element along the first mutually opposite movement directions 7. This means that the flanges 9, 10 are always also moved in the first movement directions 7 when the closing element 5 is moved in the mutually opposite first movement directions 7 by the valve drive 6.

Both the flanges 9 and 10 and also the closing element 5 are guided via spring elements 25 on guide rods 26. The guide rods 26 also comprises stops 28, the function of which will be explained in more detail below.

FIG. 3 shows, in a longitudinal section through the valve 1, the position of the closing element 5 in the closed position, closing one of the valve openings 3. A comparison of FIG. 3 and FIG. 4 shows that the closing element 5 is moved by the valve drive 6, configured as a linear drive, to and fro in the first mutually opposite movement directions 7 between the fully opened position in FIG. 4 and an intermediate position. This is also known in itself. In the intermediate position, the closing element 5 is raised from both valve openings 3 but arranged between the valve openings 3. The closing element 5 is moved out of this intermediate position in one of the two movement directions 8, in the direction towards the wall region 4 surrounding the corresponding valve opening 3, or in other words towards the valve seat, in that the valve drive 6 travels against the stops 28 and causes the tilt plates 27 to spread accordingly, hence ensuring that the valve element 5 presses against the valve seat or the wall region 4 of the valve housing 2 surrounding the valve opening 3. Thus the closing element 5 is brought into its closed position in which it closes one of the valve openings 3, as shown in FIG. 3.

In order to bring the closing element 5 back to the intermediate position from this closed position, the valve drive 6 lifts the valve rod 24 slightly in one of the first movement directions 7, whereby the tilt plates 27 tip back accordingly into the position shown in FIG. 4. Further lifting of the valve rod 24 in one of the first movement directions 7 also lifts the closing element 5, with flanges 9, 10, into the fully opened position shown in FIG. 4. Because of their forced coupling with respect to the first movement direction 7, the flanges 9, 10 are moved with the closing element 5. A corresponding impact against the stops 28 spreads apart the flanges 9 and 10, by means of the tilt plates 27 arranged there, in one of the spreading directions 29, so that the flanges 9 and 10 are pressed against the mutually opposite wall regions 4 of the valve housing 2 in the fully opened position of the closing element 5, and thus the passage openings 11 of the flanges 9 and 10 connect the valve openings 3 together, as shown in FIG. 4. All this is achieved in this exemplary embodiment by a single valve drive 6 which is configured as a linear drive. The spreading by means of the stops 28 and the tilt plates 27, and the return by means of the spring elements 25, of both the closing element 5 in the mutually opposite second movement directions 8 and also of the flanges 9 and 10 in the mutually opposite spread directions 29, is known in itself and part of the prior art, so need not be explained further. It is merely pointed out that, by deviation from the exemplary embodiment shown here, valves 1 according to the invention may naturally also have two closing elements, each of which closes one of the valve openings 3 on mutually opposite sides in the closed position. This may be achieved simply by replacing the support plate 30 used here with a second closing element 5. The closing element or elements 5 are however favorably designed as valve plates in preferred embodiments.

In the exploded illustration of FIG. 5, it is clearly evident that, in this exemplary embodiment too, according to the invention the two flanges 9 and 10 each have a sequence of fingers 12 and recesses 13 each arranged between two adjacent fingers 12. It is clear from FIG. 6, but also from FIGS. 3 and 4, that the fingers 12 of the respective flange 9 or 10 surround the passage openings 11 of the respective flange 9, 10, and the fingers 12 of the one flange 9 each engage in one of the recesses 13 of the other flange 10.

Favorably, as shown here, this is the case in all positions of the flanges 9 and 10 relative to one another. It is furthermore also favorable that the fingers 12 of the one flange 9 do not touch the fingers 12 of the other flange 10. It is clearly evident in FIG. 5 that the fingers 12 of the two flanges 9 and 10 shown here are formed as plates, more precisely in the form of wedge plates. They are preferably formed straight and elongate, and with their freely protruding ends each point in the direction towards the other flange 9 or 10. FIG. 5 furthermore clearly shows that, here, the fingers 12 of the respective flange 9 and 10 surround the passage opening 11 of the respective flange 9 and 10 as a ring.

As already explained initially, exemplary embodiments according to the invention may also comprise fingers 12 which are formed less like plates but more like pins. As shown in FIGS. 3 and 4, it is favorably provided that the opening cross-sections 14 of the passage openings 11 of the flanges 9 and 10 are the same size everywhere, at least in the region of the fingers 12.

FIG. 5 also shows the bush 15 and the peripheral, outwardly protruding bead 17 formed on each flange 9 and 10. FIG. 5 also shows the takeoff connectors 20 and 21 with their respective inwardly pointing peripheral beads 25.

Figure 6:
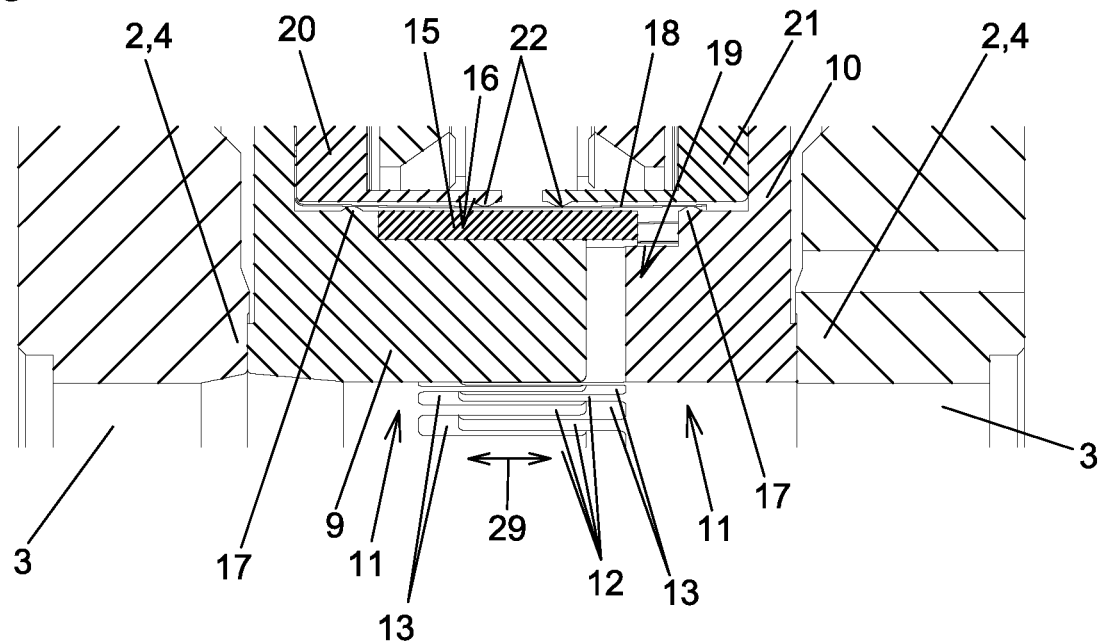

The assembled operating state is now explained with reference to FIG. 6, which shows an enlarged view of extract A from FIG. 4. A combined view of FIGS. 5 and 6 clearly shows that the flanges 9 and 10 in the region of the fingers 12 are arranged inside the bush 15 which connects the flanges 9 and 10 together. The bush 15 is mounted displaceably on at least one of the flanges 9 or 10, so as not to disrupt a corresponding relative movement of the flanges 9 and 10 towards and away from one another. In this exemplary embodiment however, the flanges 9 and 10 are connected together electrically conductively by means of the here peripherally closed tubular contact plate 18. The fingers 12 of the flanges 9 and 10 are arranged in the interior 19 surrounded by the contact plate 18. FIG. 6 also clearly shows that the contact plate 18 lies on the respective beads 17 of the flanges 9 and 10 with the aim of optimum electrical contact between the flanges 9 and 10. This preferably applies in all relative positions of the two flanges 9 and 10. FIG. 6 also shows how the takeoff connectors 20 and 21 are arranged on the respective outside of the respective flange 9 and 10 opposite the passage opening 11. The contact plate 18, as shown in FIG. 6, in this exemplary embodiment is also guided between the respective takeoff connectors 20 and 21 and the respective flange 9 and 10.

The inwardly protruding beads 22 of the takeoff connectors 20 and 21 each press from the outside against the contact plate 18. The two flanges 9 and 10 are thus permanently connected together electrically conductively via the contact plate 18. A degree of elasticity of the contact plate 18, and the arrangement between the beads 17 of the flanges 9 and 10 and the beads 22 of the takeoff connectors 20 and 21, particularly ensure a secure contact in all relative positions of the flanges 9 and 10. It is favorable here if, as also shown in FIG. 6, the beads 22 of the takeoff connectors 20 and 21 are arranged in a region between the beads 17 of the flanges 9 and 10. As a whole, in this exemplary embodiment according to the invention, a valve 1 is obtained in which electrically charged particles or jets conducted through the valve opening 3 and passage openings 11 are deflected or disrupted as little as possible.

LIST OF REFERENCE SIGNS

1 Valve
2 Valve housing
3 Valve opening
4 Wall region
5 Closing element
6 Valve drive
7 First movement direction
8 Second movement direction
9 Flange
10 Flange
11 Passage opening
12 Finger
13 Recess 14 Opening cross-section
15 Bush
16 Outside
17 Bead
18 Contact plate
19 Interior
20 Takeoff connector
21 Takeoff connector
22 Bead
23 Housing flange
24 Valve rod
25 Spring element
26 Guide rod
27 Tilt plate
28 Stop
29 Spread directions
30 Support plate

The invention claimed is:

1. A valve, comprising:
a valve housing having valve openings in mutually opposite wall regions of the valve housing;
a closing element that in a closed position closes at least one of the valve openings, in an intermediate position is raised from both of the valve openings and is arranged between the valve openings, and in a fully opened position fully opens the valve openings;
at least one valve drive configured to move the closing element to and fro in mutually opposite first movement directions between the fully opened position and the intermediate position, and in mutually opposite second movement directions between the intermediate position and the closed position;
two mutually opposite flanges, each having a passage opening;
the flanges are movable towards and away from one another by the at least one valve drive and are connected to the closing element by forced coupling moveably with respect to movements of the closing element in the first movement directions;
the flanges in the fully opened position of the closing element are pressed against the mutually opposite wall regions of the valve housing and thus the passage openings of the flanges connect the valve openings together; and
the two flanges each comprise a sequence of fingers and recesses arranged respectively between two adjacent fingers, and the fingers of the respective flange surround the passage opening of the respective flange, and the fingers of one said flange engage in the respective recesses of the other said flange.

2. The valve as claimed in claim 1, wherein at least one of a) the fingers of the one flange each engage in the recesses of the respective other flange in all positions of the flanges relative to one another, or b) the fingers of the one flange do not touch the fingers of the other flange.

3. The valve as claimed in claim 1, wherein at least one of a) the fingers of the respective flange surround the passage opening of the respective flange as a ring, or b) the fingers of the respective flange are formed as at least one of straight or elongate towards the other flange.

4. The valve as claimed in claim 1, wherein opening cross-sections of the passage openings of the flanges are a same size at least in a region of the fingers.

5. The valve as claimed in claim 1, wherein the flanges are arranged in a region of the fingers inside a bush which connects the flanges together.

6. The valve as claimed in claim 1, wherein each said flange has a respective peripheral and outwardly protruding bead on an outside thereof opposite the passage opening.

7. The valve as claimed in claim 1, wherein the flanges are connected together electrically conductively by a contact plate.

8. The valve as claimed in claim 7, wherein the contact plate is at least one of peripherally closed or tubular and at least partially surrounds the fingers of the flanges.

9. The valve as claimed in claim 7, wherein each said flange has a respective peripheral and outwardly protruding bead on an outside thereof opposite the passage opening, and the contact plate lies on the bead of the respective flange.

10. The valve as claimed in claim 7, further comprising a takeoff connector arranged on an outside of the respective flange opposite the passage opening, and the contact plate is guided between the respective takeoff connector and the respective flange.

11. The valve as claimed in claim 10, wherein each said takeoff connector has a peripheral and inwardly protruding bead by which the respective takeoff connector presses against the contact plate.

* * * * *